US011718732B2

(12) United States Patent
Inada et al.

(10) Patent No.: US 11,718,732 B2
(45) Date of Patent: Aug. 8, 2023

(54) RESIN COMPOSITION, FILAMENT AND RESIN POWDER FOR THREE-DIMENSIONAL PRINTER, AND SHAPED OBJECT AND PRODUCTION PROCESS THEREFOR

(71) Applicant: OTSUKA CHEMICAL CO., LTD, Osaka (JP)

(72) Inventors: Kousuke Inada, Tokyo (JP); Masagoro Okada, Tokushima (JP); Akira Takarada, Tokushima (JP)

(73) Assignee: OTSUKA CHEMICAL CO., LTD, Osaka (JP)

( * ) Notice: Subject to any disclaimer, the term of this patent is extended or adjusted under 35 U.S.C. 154(b) by 0 days.

(21) Appl. No.: 17/127,149

(22) Filed: Dec. 18, 2020

(65) Prior Publication Data

US 2021/0115226 A1 Apr. 22, 2021

Related U.S. Application Data

(62) Division of application No. 16/323,992, filed as application No. PCT/JP2017/030040 on Aug. 23, 2017, now abandoned.

(30) Foreign Application Priority Data

Aug. 30, 2016 (JP) .................................. 2016-167914
Apr. 3, 2017 (JP) .................................. 2017-073789

(51) Int. Cl.
*C08K 7/04* (2006.01)
*B33Y 10/00* (2015.01)
*C08K 7/10* (2006.01)
*C08K 3/34* (2006.01)
*C08L 101/00* (2006.01)
*B29C 64/153* (2017.01)
*C08K 3/24* (2006.01)
*B33Y 70/10* (2020.01)
*B29C 64/118* (2017.01)
*C08K 3/22* (2006.01)
*C08K 9/06* (2006.01)

(52) U.S. Cl.
CPC .............. *C08K 7/10* (2013.01); *B29C 64/118* (2017.08); *B29C 64/153* (2017.08); *B33Y 70/10* (2020.01); *C08K 3/24* (2013.01); *C08K 3/34* (2013.01); *C08K 7/04* (2013.01); *C08L 101/00* (2013.01); *B33Y 10/00* (2014.12); *C08K 3/22* (2013.01); *C08K 9/06* (2013.01); *C08K 2003/2237* (2013.01); *C08K 2201/004* (2013.01)

(58) Field of Classification Search
CPC .......... B33Y 70/00; B33Y 10/00; C08K 7/04; C08K 7/10

See application file for complete search history.

(56) References Cited

U.S. PATENT DOCUMENTS

| 2014/0051786 A1 | 2/2014 | Roth et al. |
| 2014/0097737 A1 | 4/2014 | Ogasawara et al. |
| 2020/0270423 A1* | 8/2020 | Inada ...................... B29C 70/14 |

FOREIGN PATENT DOCUMENTS

| CN | 105176084 A | 12/2015 |
| CN | 105482044 A | 4/2016 |
| CN | 105504749 A | 4/2016 |
| CN | 105524429 A | 4/2016 |
| CN | 105602098 A | 5/2016 |
| CN | 105645923 A | 6/2016 |
| CN | 106633363 A | 5/2017 |
| JP | 59-226082 A | 12/1984 |
| JP | 7-90118 A | 4/1995 |
| JP | 2000-256505 A | 9/2000 |
| JP | 2001-181497 A | 7/2001 |
| JP | 2006-332128 A | 12/2006 |
| JP | 2015-150781 A | 8/2015 |
| JP | 2016-28887 A | 3/2016 |
| JP | 2016-60048 A | 4/2016 |
| KR | 20070060611 A | 6/2007 |
| WO | 2008/057844 A1 | 5/2008 |
| WO | 2010/075395 A2 | 7/2010 |
| WO | 2017/221599 A1 | 12/2017 |

OTHER PUBLICATIONS

Machine translation of CN 105482044 A, published Apr. 13, 2016.*
International Search Report dated Oct. 17, 2017, issued in counterpart International Application No. PCT/JP2017/030040(2 pages).
Notification of Transmittal of Copies of Translation of the International Preliminary Report on Patentability (Form PCT/IB/338) issued in counterpart International Application No. PCT/JP2017/030040 dated Mar. 14, 2019, with Forms PCT/IB/373 and PCT/ISA/237. (8 pages).
Extended (Supplementary) European Search Report dated Dec. 2, 2019, issued in counterpart EP application No. 17846236.2. (6 pages).
Office Action dated Jan. 7, 2020, issued in counterpart JP application No. 2018-537174, with English translation. (10 pages).

(Continued)

*Primary Examiner* — Vickey Nerangis

(74) *Attorney, Agent, or Firm* — WHDA, LLP

(57) ABSTRACT

Provided is a resin composition, a filament and resin powder for a three-dimensional printer, a shaped object, and a production method for the shaped object, all of which make it easy to produce a shaped object and can improve, in shaping using a three-dimensional printer, the resistance to delamination of the shaped object and the resistance to warpage and shrinkage of the shaped object. A resin composition contains: inorganic fibers having an average fiber length of 1 μm to 300 μm and an average aspect ratio of 3 to 200; and a thermoplastic resin and serves as a shaping material for a three-dimensional printer.

3 Claims, 2 Drawing Sheets

(56) References Cited

OTHER PUBLICATIONS

Office Action dated Jun. 16, 2020, issued in counterpart JP Application No. 2018-537174, with English Translation. (6 pages).
Office Action dated Nov. 16, 2020, issued in counterpart TW Application No. 106129297. (6 pages).
Office Action dated Oct. 19, 2020, issued in counterpart CN Application No. 201780053239.7, with English Translation. (34 pages).
Office Action dated Oct. 13, 2020, issued in counterpart IN Application No. 201917001956, with English Translation. (6 pages).
Office Action dated Apr. 9, 2021, issued in counterpart EP Application No. 17 846 236.2 (5 pages).
"3D printing molding materials"; Cited in CN Office Action dated Apr. 25, 2021. (5 pages).
Office Action dated Apr. 25, 2021, issued in counterpart CN Application No. 201780053239.7, with English Translation. (34 pages).
Non-Final Office Action dated Sep. 12, 2022, issued in U.S. Appl. No. 17/210,933. (37 pages).
Final Office Action dated Jan. 25, 2023, issued in U.S. Appl. No. 17/210,933. (12 pages).
Office Action dated May 3, 2023, issued in counterpart EP Application No. 17846236.2. (9 pages).
Jinsong Yang et al.: "Selective laser sintering of polyamide 12/potassium titanium whisker composites", Journal of Applied Polymer Science, vol. 117, No. 4, Aug. 15, 2010 (Aug. 15, 2010), pp. 2196-2204, XP055636606, US, ISSN: 0021-8995, DOI: 10.1002/app.31965; Cited in EP Office Action dated May 3, 2023. (9 pages).
Non-Final Office Action dated May 23, 2023, issued in U.S. Appl. No. 17/210,933 (31 pages).

\* cited by examiner

[FIG. 1]
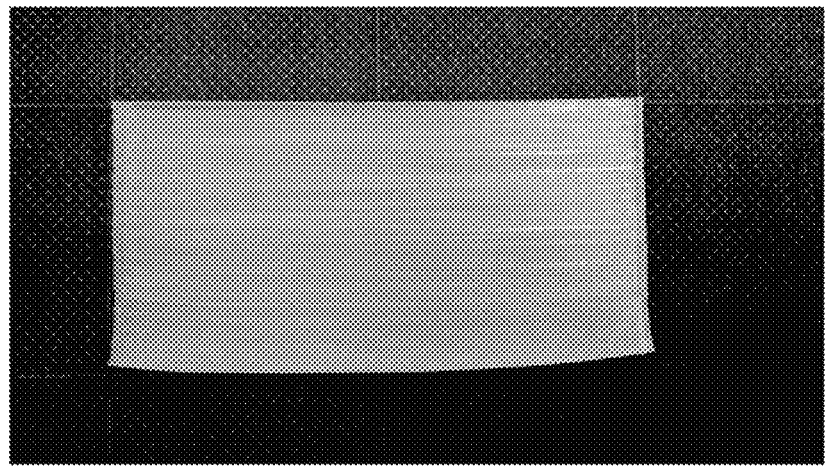
[FIG. 2]
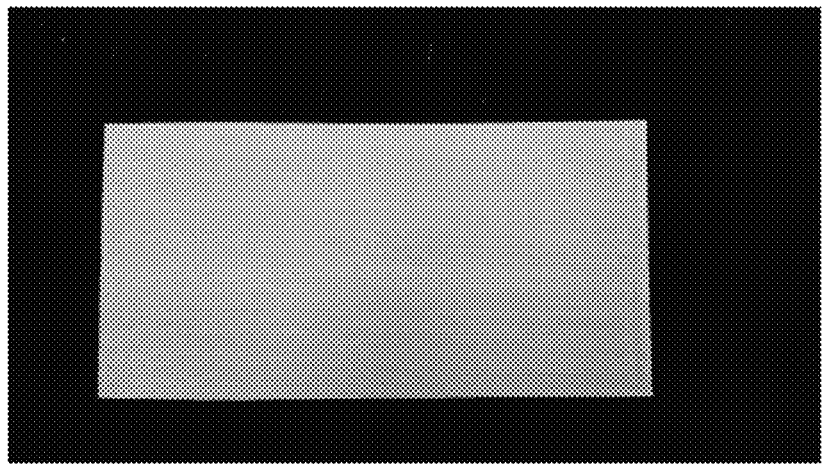
[FIG. 3]
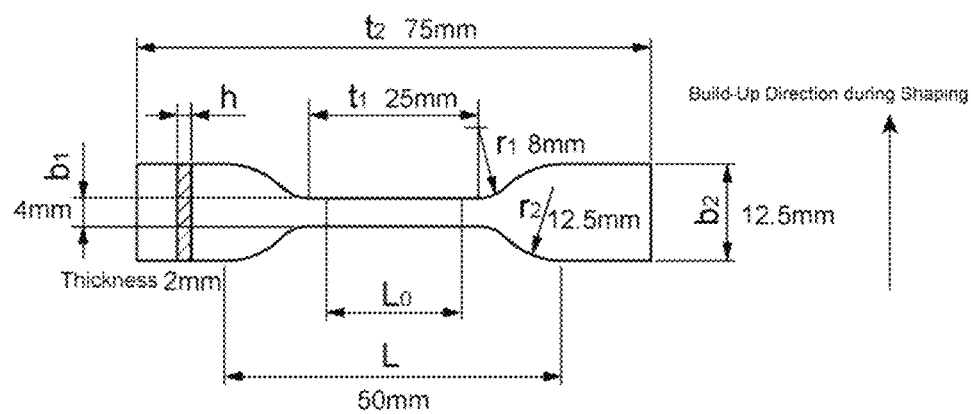

[FIG. 4]
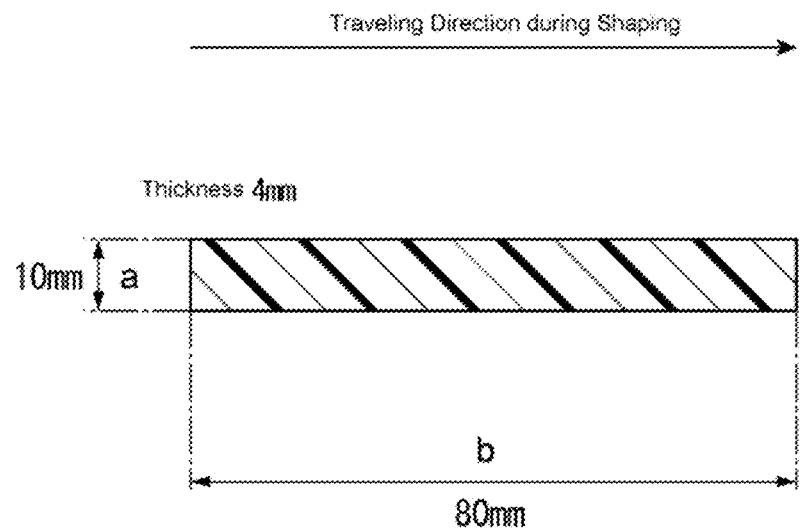
[FIG. 5]
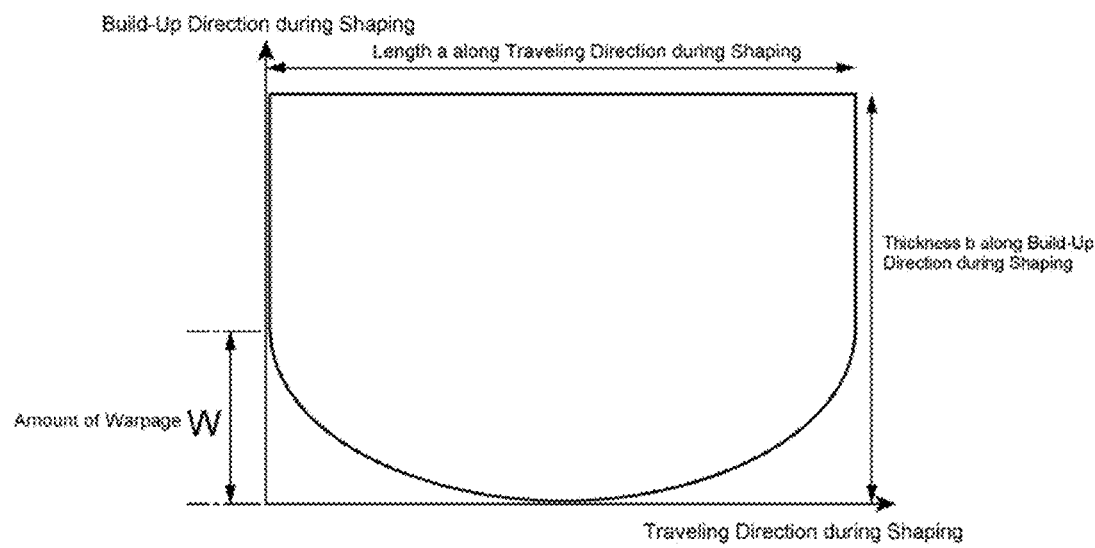
[FIG. 6]
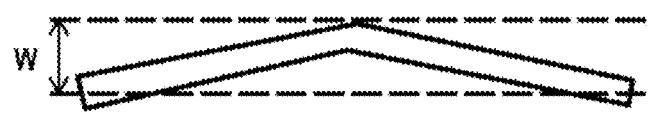

RESIN COMPOSITION, FILAMENT AND RESIN POWDER FOR THREE-DIMENSIONAL PRINTER, AND SHAPED OBJECT AND PRODUCTION PROCESS THEREFOR

CROSS-REFERENCE TO RELATED APPLICATIONS

This application is a divisional of U.S. application Ser. No. 16/323,992 filed on Feb. 7, 2019, which is a National Stage Application of International Application No. PCT/JP2017/030040 filed on Aug. 23, 2017, which claims priority to Japan Patent Application No. 2017-073789 filed on Apr. 3, 2017 and Japan Patent Application No. 2016-167914 filed on Aug. 30, 2016, the entire contents of which are hereby incorporated by reference.

TECHNICAL FIELD

The present invention relates to resin compositions as shaping materials for three-dimensional printers, filaments and resin powders for three-dimensional printers, and shaped objects and production methods for the shaped objects.

BACKGROUND ART

A three-dimensional (3D) printer is a technology for calculating the shapes of thin cross-sections from three-dimensional data input by a CAD or the like and depositing layer upon layer of a material based on the calculation results to shape a 3D object and is also referred to as additive manufacturing technology. The three-dimensional printer requires no mold assembly that should be used in injection molding, enables the shaping of complicated 3D structures that could not be molded by injection molding, and has therefore received attention as a high-mix low-volume manufacturing technology.

As materials for the three-dimensional printer (also referred to as additive manufacturing materials), various materials have been developed according to the process or usage of the three-dimensional printer. The major materials used include light curable resins, thermoplastic resins, metals, ceramics, and wax.

The three-dimensional printer technology is classified, based on how to three-dimensionally shape an object from a material, into (1) binder jetting process, (2) directed energy deposition process, (3) material extrusion process, (4) material jetting process, (5) powder bed fusion process, (6) sheet lamination process, (7) vat photopolymerization process, and others. Three-dimensional printers adopting, among the above processes, the material extrusion process (also referred to as the fused deposition modeling process) are decreasing in price and therefore increasing in demand as those for home use and office use. Furthermore, in relation to three-dimensional printers adopting the powder bed fusion process, the development of a system achieving improvements in recyclability of powder materials has advanced. Therefore, the powder bed fusion process is a process attracting much attention.

The fused deposition modeling process is a process for shaping an object by fluidizing a thermoplastic resin having the shape of a thread called a filament or other shapes with a heating device inside an extrusion head, then discharging the fluid resin through a nozzle onto a platform, and cooling the resin into a solid state while gradually depositing layer upon layer of it according to the cross-sectional shapes of a desired object to be shaped. However, if the shaping is made using a thermoplastic resin not blended with any additive (so-called neat resin), there arise problems including delamination of a shaped object and warpage of the shaped object. Furthermore, if a thermoplastic resin blended with a fibrous filler, such as glass fibers or carbon fibers, is used, there arises a problem of difficulty of shaping due to clogging of the extrusion head, wear of the extrusion head, and so on.

Meanwhile, Patent Literature 1 discloses that with the use of a thermoplastic resin blended with a nanofiller, such as carbon nanotubes, for a fused deposition modeling-based three-dimensional printer, a shaped object can be obtained which has a desired function that could not be achieved by a thermoplastic resin only.

The powder bed fusion process is a process for shaping an object by forming a thin layer of resin powder, melting it with an energy source, such as laser or electronic beam, according to the cross-sectional shape of a desired object to be shaped, solidifying it, depositing a new thin layer of resin powder on top of the solid, likewise melting it with the energy source, such as laser or electronic beam, according to the cross-sectional shape of the desired object to be shaped, solidifying it, and repeating these steps.

CITATION LIST

Patent Literature

Patent Literature 1: JP-A-2016-28887

SUMMARY OF INVENTION

Technical Problem

However, it is known that uniform dispersion of a nanofiller in a thermoplastic resin as in Patent Literature 1 is not easy and that the melting viscosity of an obtained thermoplastic resin composition increases. Furthermore, Patent Literature 1 discloses no specific method for improving the resistance to delamination of a shaped object and the resistance to warpage and shrinkage of the shaped object. Also in the powder bed fusion process, since resin is deposited layer by layer, there arise problems of, like the fused deposition modeling process, delamination of a shaped object and warpage and shrinkage of the shaped object.

An object of the present invention is to provide a resin composition, a filament and resin powder for a three-dimensional printer, a shaped object, and a production method for the shaped object, all of which make it easy to produce a shaped object and can improve, in shaping using a three-dimensional printer, the resistance to delamination of the shaped object and the resistance to warpage and shrinkage of the shaped object.

Solution to Problem

The present invention provides a resin composition, a filament and resin powder for a three-dimensional printer, a shaped object, and a method for producing the shaped object which are described below.

Aspect 1: A resin composition containing: inorganic fibers having an average fiber length of 1 μm to 300 μm and an average aspect ratio of 3 to 200; and a thermoplastic resin, the resin composition serving as a shaping material for a three-dimensional printer.

Aspect 2: The resin composition according to aspect 1, wherein the inorganic fibers have a Mohs hardness of 5 or less.

Aspect 3: The resin composition according to aspect 1 or 2, wherein the inorganic fibers are at least one selected from the group consisting of potassium titanate and wollastonite.

Aspect 4: The resin composition according to any one of aspects 1 to 3, wherein a content of the inorganic fibers is 1% by mass to 40% by mass in a total amount of 100% by mass of the resin composition.

Aspect 5: The resin composition according to any one of aspects 1 to 4, wherein the three-dimensional printer is based on a fused deposition modeling process or a powder bed fusion process.

Aspect 6: A filament fora fused deposition modeling-based three-dimensional printer, the filament being made of the resin composition according to any one of aspects 1 to 4.

Aspect 7: A resin powder for a powder bed fusion-based three-dimensional printer, the resin powder being made of the resin composition according to any one of aspects 1 to 4.

Aspect 8: A shaped object shaped from the resin composition according to any one of aspects 1 to 4 with a three-dimensional printer.

Aspect 9: A shaped object shaped from the filament according to aspect 6 with a fused deposition modeling-based three-dimensional printer.

Aspect 10: A shaped object shaped from the resin powder according to aspect 7 with a powder bed fusion-based three-dimensional printer.

Aspect 11: A method for producing a shaped object, wherein a shaped object is produced with a three-dimensional printer using the resin composition according to any one of aspects 1 to 4.

Aspect 12: A method for producing a shaped object, wherein the filament according to aspect 6 is fed to a fused deposition modeling-based three-dimensional printer.

Aspect 13: A method for producing a shaped object, wherein the resin powder according to aspect 7 is fed to a powder bed fusion-based three-dimensional printer.

Advantageous Effects of Invention

The present invention makes it easy to produce a shaped object and can improve, in shaping using a three-dimensional printer, the resistance to delamination of the shaped object and the resistance to warpage and shrinkage of the shaped object.

BRIEF DESCRIPTION OF DRAWINGS

FIG. 1 is a photograph showing a shaped object produced using a resin composition according to Comparative Example 1.

FIG. 2 is a photograph showing a shaped object produced using a resin composition according to Example 2.

FIG. 3 is a side view showing the shape of a tensile specimen.

FIG. 4 is a cross-sectional view showing the shape of a bending specimen.

FIG. 5 is a schematic side view for illustrating the amount of warpage of flat-plate shaped objects made in Test Examples 1 to 11 and Comparative Test Examples 1 to 8.

FIG. 6 is a schematic side view for illustrating the amount of warpage of shaped objects of bending specimens made in Test Example 34 and Comparative Test Examples 23 to 24.

DESCRIPTION OF EMBODIMENTS

Hereinafter, a description will be given of an example of a preferred embodiment for working of the present invention. However, the following embodiment is simply illustrative. The present invention is not at all limited by the following embodiment.

<Resin Composition>

A resin composition according to the present invention contains: inorganic fibers (A) having an average fiber length of 1 μm to 300 μm and an average aspect ratio of 3 to 200; and a thermoplastic resin (B) and may further contain other additives (C) as necessary.

(Inorganic Fibers (A))

The inorganic fibers for use in the present invention are powder formed of fibrous particles and have an average fiber length of 1 μm to 300 μm and an average aspect ratio of 3 to 200. The average fiber length is preferably 1 μm to 200 μm, more preferably 3 μm to 100 μm, and still more preferably 5 μm to 50 μm. The average aspect ratio is preferably 3 to 100, more preferably 5 to 50, and still more preferably 8 to 40. The use of the inorganic fibers having the above average fiber length and average aspect ratio makes it easy to produce a shaped object and can improve, in shaping using a three-dimensional printer, the resistance to delamination of the shaped object and the resistance to warpage and shrinkage of the shaped object.

The inorganic fibers for use in the present invention has, from the viewpoint of wear of an extrusion head, a Mohs hardness of preferably 5 or less, more preferably 1 to 5, and still more preferably 2 to 5. Examples of the type of the inorganic fibers include potassium titanate, wollastonite, aluminum borate, magnesium borate, xonotlite, zinc oxide, and basic magnesium sulfate. Preferred among the above various types of inorganic fibers is, from the viewpoint of mechanical properties, at least one selected from the group consisting of potassium titanate and wollastonite. The Mohs hardness is an index indicating the hardness of a substance, wherein when two different minerals are rubbed against each other, scratched one of them is a substance having a lower hardness.

Heretofore known potassium titanates can be widely used and examples include potassium tetratitanate, potassium hexatitanate, and potassium octatitanate. There is no particular limitation as to the dimensions of potassium titanate so long as they are within the above-described dimensions of the inorganic fibers. However, normally, its average fiber diameter is 0.01 μm to 1 μm, preferably 0.05 μm to 0.8 μm, and more preferably 0.1 μm to 0.7 μm, its average fiber length is 1 μm to 50 μm, preferably 3 μm to 30 μm, and more preferably 10 μm to 20 μm, and its average aspect ratio is 10 or more, preferably 10 to 100, and more preferably 15 to 35. In the present invention, even marketed products can be used and examples that can be used include "TISMO D" (average fiber length: 15 μm, average fiber diameter: 0.5 μm) and "TISMO N" (average fiber length: 15 μm, average fiber diameter: 0.5 μm) both manufactured by Otsuka Chemical Co., Ltd.

Wollastonite is inorganic fibers made of calcium metasilicate. There is no particular limitation as to the dimensions of wollastonite so long as they are within the above-described dimensions of the inorganic fibers. However, normally, its average fiber diameter is 0.1 μm to 15 μm, preferably 1 μm to 10 μm, and more preferably 2 μm to 7 μm, its average fiber length is 3 μm to 180 μm, preferably 10 μm to 100 μm, and more preferably 20 μm to 40 μm, and its average aspect ratio is 3 or more, preferably 3 to 30, and more preferably 5 to 15. In the present invention, even marketed products can be used and an example that can be used is "Bistal W" (average fiber length: 25 μm, average fiber diameter: 3 μm) manufactured by Otsuka Chemical Co., Ltd.

The above average fiber length and average fiber diameter can be measured by observation with a scanning electron microscope, and the average aspect ratio (average fiber length/average fiber diameter) can be calculated from the average fiber length and the average fiber diameter. For example, a plurality of inorganic fibers are shot with a scanning electron microscope, images of 300 inorganic fibers are arbitrarily selected from the observed images, and their fiber lengths and fiber diameters are measured. The average fiber length can be determined by adding all the fiber diameters and dividing the sum by the number of fibers, while the average fiber diameter can be determined by adding all the fiber diameters and dividing the sum by the number of fibers.

Fibrous particles as used in the present invention means particles having an L/B of 3 or more and an L/T of 3 or more where a length L represents the dimension of the longest side of, among cuboids (circumscribing cuboids) circumscribing the particle, a cuboid having the minimum volume, a breadth B represents the dimension of the second longest side of the cuboid, and a thickness T represents the dimension of the shortest side of the cuboid. The length L and the breadth B correspond to the fiber length and the fiber diameter, respectively. Platy particles herein refer to particles having an L/B of below 3 and an L/T of 3 or more.

Regarding the inorganic fibers, in order to increase the wettability with the thermoplastic resin and further improve physical properties, such as mechanical strength, of the obtained resin composition, treated layers made of a surface treatment agent may be formed on the surfaces of inorganic fibers for use in the present invention. Examples of the surface treatment agent include silane coupling agents and titanium coupling agents. Preferred among them are silane coupling agents and more preferred are aminosilane coupling agents, epoxysilane coupling agents, vinylsilane coupling agents, and alkylsilane coupling agents. These agents may be used alone or as a mixture of two or more.

Examples of the aminosilane coupling agents include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-ethoxysilyl-N-(1,3-dimethylbutylidene)propylamine, N-phenyl-3-aminopropyltrimethoxysilane, and N-(vinylbenzyl)-2-aminoethyl-3-aminopropyltrimethoxysilane.

Examples of the epoxysilane coupling agents include 3-glycidyloxypropyl(dimethoxy)methylsilane, 3-glycidyloxypropyltrimethoxysilane, diethoxy(3-glycidyloxypropyl)methylsilane, triethoxy(3-glycidyloxypropyl)silane, and 2-(3,4-epoxycyclohexyl)ethyltrimethoxysilane.

Examples of the vinylsilane coupling agents include vinyltrimethoxysilane, 3-methacryloxypropylmethyldimethoxysilane, 3-methacryloxypropyltrimethoxysilane, 3-methacryloxypropylmethyldiethoxysilane, and 3-methacryloxypropyltriethoxysilane.

Examples of the alkylsilane coupling agents include methyltrimethoxysilane, dimethyldimethoxysilane, trimethylmethoxysilane, methyltriethoxysilane, ethyltrimethoxysilane, n-propyltrimethoxysilane, isobutyltrimethoxysilane, isobutyltrimethoxysilane, n-hexyltrimethoxysilane, n-hexyltriethoxysilane, cyclohexylmethyldimethoxysilane, n-octyltriethoxysilane, and n-decyltrimethoxysilane Known surface treatment methods can be used as the method for forming treated layers made of a surface treatment agent on the surfaces of the inorganic fibers and examples include: a wet method of dissolving the surface treatment agent in a solvent promoting hydrolysis (for example, water, an alcohol or a mixed solvent of them) to prepare a solution and spraying the solution on the inorganic fibers; and an integral blend method of blending the inorganic fibers and the surface treatment agent with the resin composition.

No particular limitation is placed on the amount of surface treatment agent in treating the surfaces of the inorganic fibers according to the present invention with the surface treatment agent, but, in the case of the wet method, the solution of the surface treatment agent may be sprayed so that the amount of surface treatment agent reaches 0.1 parts by mass to 5 parts by mass and preferably 0.3 parts by mass to 2 parts by mass relative to 100 parts by mass of inorganic fibers. On the other hand, in the case of the integral blend method, the surface treatment agent may be blended with the resin composition so that the amount of surface treatment agent reaches 0.1 parts by mass to 20 parts by mass relative to 100 parts by mass of inorganic fibers. If the amount of surface treatment agent is within the above ranges, the adhesion of the inorganic fibers to the thermoplastic resin can increase to improve the dispersibility of the inorganic fibers.

(Thermoplastic Resin (B))

No particular limitation is placed on the type of the thermoplastic resin for use in the resin composition according to the present invention so long as it can be used in three-dimensional printers, but examples that can be cited include: polyolefin resins, such as polypropylene (PP) resin, polyethylene (PE) resin, cyclic polyolefin (COP) resin, and cyclic olefin copolymer (COC) resin; styrene resins, such as polystyrene (PS) resin, syndiotactic polystyrene (SPS) resin, and acrylonitrile-butylene-styrene copolymer (ABS) resin; polyester resins, such as polylactic (PLA) resin, polyethylene terephthalate (PET) resin, and polybutylene terephthalate (PBT) resin; polyacetal (POM) resin; polycarbonate (PC) resin; aliphatic polyamide (PA) resins, such as polyamide 6 resin, polyamide 66 resin, polyamide 11 resin, polyamide 12 resin, polyamide 46 resin, polyamide 6 resin-polyamide 66 resin copolymer (polyamide 6/66 resin), and polyamide 6 resin-polyamide 12 resin copolymer (polyamide 6/12 resin); semi-aromatic polyamide (PA) resins composed of a structural unit with an aromatic ring and a structural unit free from aromatic ring, such as polyamide MXD6 resin, polyamide 6T resin, polyamide 9T resin, and polyamide 10T resin; polyphenylene sulfide (PPS) resin; polyether sulfone (PES) resin; liquid crystal polyester (LCP) resin; aromatic polyether ketone resins, such as polyether ketone (PEK) resin, polyether ether ketone (PEEK) resin, polyether ketone ketone (PEKK) resin, and polyether ether ketone ketone (PEEKK) resin; polyether imide (PEI) resin; polyamide-imide (PAI) resin; and thermoplastic polyimide (TPI) resin.

Preferred in the fused deposition modeling-based three-dimensional printer and the powder bed fusion-based three-dimensional printer is at least one selected from the group consisting of polyolefin resin, styrene resin, polyester resin, polyacetal (POM) resin, polycarbonate (PC) resin, aliphatic polyamide (PA) resin, semi-aromatic polyamide (PA) resin, polyphenylene sulfide (PPS) resin, polyether imide (PEI) resin, and polyether ether ketone (PEEK) resin.

Mixtures of at least two compatible thermoplastic resins selected from among the above thermoplastic resins, i.e., polymer alloys, or the like can also be used.

(Other Additives (C))

The resin composition according to the present invention may contain other additives without any loss of its preferred physical properties. Examples of the other additives include inorganic fillers other than the above-mentioned inorganic fibers, a stabilizer, a nucleating agent, an antistat, an antioxidant, a weatherproofer, a metal deactivator, a ultraviolet ray absorber, a germ- and mildew-proofing agent, a deodorant, a conductive additive, a dispersant, a softener (plasticizer), a colorant, a flame retardant, a sound deadener, a neutralizer, an antiblocking agent, a flow modifier, a mold release agent, a lubricant, and an impact resistance improver. The resin composition may contain at least one of these additives.

(Method for Producing Resin Composition)

The resin composition according to the present invention can be produced by mixing and heating (particularly, melt kneading) the above components, i.e., the inorganic fibers (A), the thermoplastic resin (B), and, as necessary, the other additives (C).

For melt kneading, any known melt kneader, for example, a biaxial extruder, can be used. Specifically, the resin composition can be produced by: (1) a method of preliminarily mixing the components with a mixer (a tumbler, a Henschel mixer or the like), melt kneading the mixture with a melt kneader, and then pelletizing it with a pelletization device (such as a pelletizer); (2) a method of adjusting a master batch of desired components, mixing it with other components as necessary, and melt kneading the mixture into pellets with a melt kneader; (3) a method of feeding the components into a melt kneader to form pellets; or other methods.

No particular limitation is placed on the processing temperature during melt kneading so long as it is within a temperature range in which the thermoplastic resin (B) can melt. Normally, the cylinder temperature of a melt kneader for use in the melt kneading is controlled within this range.

The content of the inorganic fibers (A) in the resin composition according to the present invention is, in a total amount of 100% by mass of the resin composition, preferably 1% by mass to 40% by mass, more preferably 3% by mass to 30% by mass, and still more preferably 7% by mass to 25% by mass.

The content of the thermoplastic resin (B) in the resin composition according to the present invention is, in a total amount of 100% by mass of the resin composition, preferably 50% by mass to 99% by mass, more preferably 60% by mass to 97% by mass, and still more preferably 65% by mass to 93% by mass.

No particular limitation is placed on the content of other additives (C) which are additives except for the above-described essential components and allowed to be used in the present invention, without any loss of the preferred physical properties of the resin composition. The content of the other additives is normally 10% by mass or less and preferably 5% by mass or less in a total amount of 100% by mass of the resin composition.

By controlling the components of the resin composition according to the present invention within the above ranges, the resistance to delamination of a shaped object and the resistance to warpage and shrinkage of the shaped object in shaping using a three-dimensional printer can be improved.

In this manner, the resin composition according to the present invention exerting desired effects is produced.

<Shaping Material for Three-Dimensional Printer>

The resin composition according to the present invention is a shaping material for a three-dimensional printer. The shaping material for a three-dimensional printer in the present invention refers to a material for use in applying it to a three-dimensional printer (also referred to as an additive manufacturing apparatus) to obtain a three-dimensional shaped object and is composed of the resin composition.

The shaping material for a three-dimensional printer according to the present invention can be used in any method so long as the method is to shape an object by melting the shaping material by heat based on a design on a computer. For example, the shaping material can be suitably used in the fused deposition modeling process or the powder bed fusion process.

The fused deposition modeling process is a process for shaping a desired shaped object by fluidizing a thermoplastic resin having the shape of pellets, the shape of a thread called a filament or other shapes with a heating device inside an extrusion head, then discharging the fluid resin through a nozzle onto a platform, and cooling the resin into a solid state while gradually depositing layer upon layer of it. The use of the resin composition according to the present invention as a shaping material enables shaping using a fused deposition modeling-based three-dimensional printer without clogging of the extrusion head or wear of the extrusion head that might occur with the use of a resin composition blended with a fibrous filler, such as glass fibers or carbon fibers. For example, even through a thin nozzle having a head diameter of 0.5 mm or less, shaping can be achieved without the occurrence of clogging of the extrusion head or wear of the extrusion head. In addition, it can be assumed that, although the reason is not clear, the inorganic fibers (A) can not only improve the resistance to warpage and shrinkage of the shaped object but also increase the interfacial strength between the layered resin portions, thus preventing delamination of the shaped object.

No particular limitation is placed on the method for producing a filament and an example is a method including: an extrusion step of extruding the resin composition according to the present invention produced by the above-described method as a molten strand through a die hole in a molder and guiding the molten strand into a cooling water bath to obtain a strand; a stretching step of hot stretching the strand to obtain a filament; and the step of rolling up the filament.

No particular limitation is placed on the shape of the filament. Examples that can be cited as the cross-sectional shape thereof include circular, rectangular, flattened, ellipsoidal, cocoon-like, trefoil, and like non-circular shapes. Circular is preferred from the viewpoint of ease of handling. No limitation is placed on the length of the filament and it can be set at any value according to industrial production conditions or without interfering with the use for a fused deposition modeling-based three-dimensional printer. No particular limitation is also placed on the diameter of the filament and, for example, it is 0.5 mm to 3 mm and particularly 1 mm to 2 mm. Note that the diameter of the filament refers to the maximum of diameters measured on cross-sections of the filament perpendicular to the direction of length of the filament.

The filament may be a composite filament in which the resin composition according to the present invention is combined with another or other resin components. Examples of the cross-sectional structure of the composite filament that can be cited include a radially oriented structure, a side-by-side structure, a sea-island structure, and a core-in-sheath structure.

The powder bed fusion process is a process for shaping an object by depositing resin powder layer by layer, melting each layer into a particular cross-sectional shape with an energy source, such as laser or electronic beam, and solidifying it. Since the resin composition according to the present invention is used as a shaping material, it can be assumed that, although the reason is not clear, the inorganic fibers (A) can not only improve the resistance to warpage and shrinkage of the shaped object but also increase the interfacial strength between the layered resin portions, thus preventing delamination of the shaped object.

No particular limitation is placed on the method for producing resin powder and examples include: a method of producing resin powder by crushing the resin composition with a crusher or other means, then grinding the crushed product with a jet mill or other means, and then classifying the ground product (mechanical grinding method); a method of producing resin powder by dissolving the resin composition in a solvent and then cooling the solution (precipitation method); and a method of producing resin powder by melt mixing a resin A and a resin B incompatible with the resin A and immersing the obtained molten mixture in a solvent poor for the resin A and good for the resin B, thus decomposing the molten mixture (melt-mixing method). No limitation is placed on the particle diameter of the resin powder and it can be set at any value according to industrial production conditions or without interfering with the use for a three-dimensional printer, but the average particle diameter is preferably 10 μm to 150 μm and more preferably 30 μm to 80 μm.

The average particle diameter can be measured by the laser diffraction and scattering method and is a particle diameter at a cumulative integrated value of 50% in a particle size distribution measured by the laser diffraction and scattering method (a volume-based 50% cumulative particle diameter), i.e., $D_{50}$ (a median diameter). This volume-based 50% cumulative particle diameter ($D_{50}$) is a particle diameter at a cumulative value of 50% in a cumulative curve of a particle size distribution determined on a volume basis, the cumulative curve assuming the total volume of particles as 100%, where during accumulation the number of particles is counted from a smaller size side.

Examples of the shape of particles forming the powder include spherical and amorphous (amoeboid, boomerang-like, cross, konpeito-like, potato-like, and so on), but spherical is preferred from the viewpoint of interface strength. The shapes of particles can be observed by scanning electron microscopy.

<Shaped Object and Production Method Therefor>

A shaped object according to the present invention is an object shaped from the resin composition according to the present invention with a three-dimensional printer. In using the resin composition according to the present invention in the form of a filament, a shaped object can be produced, for example, by performing shaping by feeding the filament into a fused deposition modeling-based three-dimensional printer. In using the resin composition according to the present invention in the form of powder, a shaped object can be produced, for example, by performing shaping by feeding the powder into a powder bed fusion-based three-dimensional printer.

In a method for producing a shaped object according to the present invention, a shaped object is produced by a three-dimensional printer using the resin composition according to the present invention.

In using the resin composition according to the present invention in the form of a filament, a shaped object can be produced, for example, by feeding the filament into a fused deposition modeling-based three-dimensional printer. Specifically, a shaped object can be produced by feeding the filament into a fused deposition modeling-based three-dimensional printer, fluidizing the filament with a heating device inside an extrusion head, then discharging the fluid through a nozzle onto a platform, and cooling it into a solid state while gradually depositing layer upon layer of it according to the cross-sectional shape of a desired object to be shaped.

In using the resin composition according to the present invention in the form of powder, a shaped object can be produced, for example, by feeding the powder into a powder bed fusion-based three-dimensional printer. Specifically, a shaped object can be produced by feeding the resin powder into a powder bed fusion-based three-dimensional printer, forming on a vertically movable pan a thin layer of the resin powder supplied through a supply head, melting it with an energy source, such as laser or electronic beam, according to the cross-sectional shape of a desired object to be shaped, solidifying it, depositing a new thin layer of the resin powder on top of the solid, likewise melting it with the energy source, such as laser or electronic beam, according to the cross-sectional shape of the desired object to be shaped, solidifying it, and repeating these steps.

EXAMPLES

Hereinafter, a specific description will be given of the present invention with reference to Examples and Comparative Examples, but the present invention is not limited to these examples. Details of raw materials used in Examples and Comparative Examples are as described below. The average fiber diameter and the average aspect ratio were measured using a field-emission scanning electron microscope (SEM, S-4800 manufactured by Hitachi High-Technologies Corporation), the shapes of particles were confirmed by the SEM, the average particle diameter was measured using, with the exception of carbon black, a laser diffraction particle size distribution measurement device (SALD-2100 manufactured by Shimadzu Corporation), and the average particle diameter of carbon black was measured using the SEM.

(Inorganic Fibers)

Potassium titanate (trade name: TISMO D102, manufactured by Otsuka Chemical Co., Ltd., average fiber length: 15 μm, average fiber diameter: 0.5 μm, average aspect ratio: 30); and Wollastonite (trade name: Bistal W, manufactured by Otsuka Chemical Co., Ltd., average fiber length: 25 μm, average fiber diameter: 3 μm, average aspect ratio: 8)

(Thermoplastic Resin)

Polyamide 12 resin (PA12 resin);
Polyamide MXD6 resin (PAMXD6 resin);
Acrylonitrile-butylene-styrene copolymer resin (ABS resin);
Cyclic olefin copolymer resin (COC resin);
Polybutylene terephthalate resin (PBT resin); and
Polyphenylene sulfide resin (PPS resin)

(Other Additives)

Carbon black (trade name: #3050, manufactured by Mitsubishi Chemical Corporation, average particle diameter: 50 nm, amorphous-shaped particles);

Talc (average particle diameter: 8 μm, platy particles); and

Glass beads (trade name: EGB 063Z, manufactured by Potters-Ballotini Co., Ltd., average particle diameter: 25 spherical particles)

<Production of Resin Composition and Filament>

Examples 1 to 11 and Comparative Examples 1 to 8

Materials were melt-kneaded in each composition ratio shown in Tables 1 and 2 using a biaxial extruder to produce pellets. The cylinder temperature of the biaxial extruder was 190° C. to 230° C. in Examples 1 to 4 and Comparative Examples 1 to 4, 230° C. to 270° C. in Examples 5 and 6 and Comparative Example 5, 200° C. to 230° C. in Examples 7 and 8 and Comparative Example 6, 210° C. to 240° C. in Example 9 and Comparative Example 7, and 200° C. to 250° C. in Examples 10 and 11 and Comparative Example 8.

The obtained pellets were loaded into a filament extruder, thus obtaining a filament with a filament diameter of 1.7 mm.

ciated printing conditions shown in Tables 3 and 4, thus producing a flat-plate shaped object 100 mm long, 2 mm wide, and 50 mm thick.

FIG. 1 shows a photograph of a shaped object (Comparative Test Example 1) produced using the resin composition according to Comparative Example 1, and FIG. 2 shows a photograph of a shaped object (Test Example 2) produced using the resin composition according to Example 2.

Test Examples 12 to 22 and Comparative Test Examples 9 to 16

The filament obtained in each of Examples 1 to 11 and Comparative Examples 1 to 8 was produced into a dumbbell tensile specimen having a shape shown in FIG. 3 by a fused deposition modeling-based three-dimensional printer (manufactured by MUTOH INDUSTRIES, LTD., trade name: MF1100) under the associated printing conditions shown in Tables 5 and 6.

TABLE 1

|  |  |  | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|---|
| Inorganic fibers | potassium titanate | % by mass | 5 | 10 | 20 |  |  |  |  |  |
|  | wollastonite | % by mass |  |  |  | 10 |  |  |  |  |
| Thermoplastic resin | PA12 resin | % by mass | 95 | 90 | 80 | 90 | 100 | 99 | 95 | 90 |
| Other additives | carbon black | % by mass |  |  |  |  |  | 1 | 5 |  |
|  | talc | % by mass |  |  |  |  |  |  |  | 10 |

TABLE 2

|  |  |  | Ex. 5 | Ex. 6 | Comp. Ex. 5 | Ex. 7 | Ex. 8 | Comp. Ex. 6 | Ex. 9 | Comp. Ex. 7 | Ex. 10 | Ex. 11 | Comp. Ex. 8 |
|---|---|---|---|---|---|---|---|---|---|---|---|---|---|
| Inorganic fibers | potassium titanate | % by mass | 10 | 20 |  | 10 | 20 |  | 10 |  | 10 | 20 |  |
| Thermoplastic resin | PAMXD6 resin | % by mass | 90 | 80 | 100 |  |  |  |  |  |  |  |  |
|  | ABS resin | % by mass |  |  |  | 90 | 80 | 100 |  |  |  |  |  |
|  | COC resin | % by mass |  |  |  |  |  |  | 90 | 100 |  |  |  |
|  | PBT resin | % by mass |  |  |  |  |  |  |  |  | 90 | 80 | 100 |

<Production of Three-Dimensional Shaped Object Based on Fused Deposition Modeling Process>

Test Examples 1 to 11 and Comparative Test Examples 1 to 8

The filament obtained in each of Examples 1 to 11 and Comparative Examples 1 to 8 was deposited into layers in a thickness direction by a fused deposition modeling-based three-dimensional printer (manufactured by MUTOH INDUSTRIES, LTD., trade name: MF1100) under the asso- Test Examples 23 to 33 and Comparative Test Examples 17 to 22

The filament obtained in each of Examples 1 to 11, Comparative Example 1, and Comparative Examples 4 to 8 was produced into a bending specimen having a shape shown in FIG. 4 by a fused deposition modeling-based three-dimensional printer (manufactured by MUTOH INDUSTRIES, LTD., trade name: MF1100) under the associated printing conditions shown in Tables 7 and 8.

<Evaluation>

(1) Amount of Warpage

The flat-plate shaped objects produced under the conditions in Tables 3 and 4 were measured in terms of amount of warpage with a caliper. The amount of warpage W is, as shown in FIG. 5, a difference in height along a build-up direction during shaping between the middle and ends of the shaped object in a traveling direction during shaping. The results are shown in Tables 3 and 4.

(2) Shrinkage

The flat-plate shaped objects produced under the conditions in Tables 3 and 4 were measured in terms of shrinkage. The shrinkage was measured in the build-up direction and the traveling direction. The shrinkage in the build-up direction is a shrinkage in the thickness b along the build-up direction during shaping shown in FIG. 5. The shrinkage in the traveling direction is a shrinkage in the length a along the traveling direction during shaping shown in FIG. 5. The results are shown in Tables 3 and 4.

(3) Interface Adhesion

The flat-plate shaped objects produced under the conditions in Tables 3 and 4 were cut along the build-up direction into 10 mm-wide strips, the obtained strips were measured in terms of bending stress by a 30 mm-span three-point bending test with a tester Autograph AG-5000 (manufactured by Shimadzu Corporation), and the measured values were assumed as interface adhesions. The results are shown in Tables 3 and 4.

(4) Tensile Strength

Dumbbell tensile specimens produced under the conditions in Tables 5 and 6 were measured in terms of tensile strength with a tester Autograph AG-1 (manufactured by Shimadzu Corporation). The results are shown in Tables 5 and 6.

(5) Flexural Strength and Flexural Modulus

Bending specimens produced under the conditions in Tables 7 and 8 were measured in terms of flexural strength and flexural modulus by a 60 mm-span three-point bending test with a tester Autograph AG-5000 (manufactured by Shimadzu Corporation). The test results are shown in Tables 7 and 8.

TABLE 3

|  |  | Test. Ex. 1 Ex. 1 | Test. Ex. 2 Ex. 2 | Test. Ex. 3 Ex. 3 | Test. Ex. 4 Ex. 4 | Comp. Test. Ex. 1 Comp. Ex. 1 | Comp. Test. Ex. 2 Comp. Ex. 2 | Comp. Test. Ex. 3 Comp. Ex. 3 | Comp. Test. Ex. 4 Comp. Ex. 4 |
|---|---|---|---|---|---|---|---|---|---|
|  | Materials used |  |  |  |  |  |  |  |  |
| Shaping conditions | nozzle temperature (° C.) | 250 | 250 | 250 | 250 | 210 | 250 | 250 | 250 |
|  | heated bed temperature (° C.) | 30 | 30 | 30 | 30 | 30 | 30 | 30 | 30 |
|  | layer height (mm) | 0.5 | 0.5 | 0.5 | 0.5 | 0.5 | 0.5 | 0.5 | 0.5 |
|  | head feed speed (mm/sec) | 30 | 30 | 30 | 30 | 30 | 30 | 30 | 30 |
| Properties | amount of warpage (mm) | 1.2 | 0.4 | 0.3 | 2.0 | 3.1 | 3.0 | 3.0 | 1.9 |
|  | shrinkage in build-up direction (%) | 0.32 | 0.18 | 0.02 | 0.08 | 0.64 | 0.61 | 0.54 | 0.43 |
|  | shrinkage in traveling direction (%) | 1.2 | 0.72 | 0.56 | 1.1 | 5.3 | 5.1 | 4.9 | 2.3 |
|  | interface adhesion (MPa) | 59 | 68 | 60 | 58 | 50 | 48 | 47 | 44 |

TABLE 4

|  |  | Test Ex. 5 Ex. 5 | Test Ex. 6 Ex. 6 | Comp. Test Ex. 5 Comp. Ex. 5 | Test. Ex. 7 Ex. 7 | Test. Ex. 8 Ex. 8 | Comp. Test Ex. 6 Comp. Ex. 6 | Test Ex. 9 Ex. 9 | Comp. Test Ex. 7 Comp. Ex. 7 | Test Ex. 10 Ex. 10 | Test Ex. 11 Ex. 11 | Comp. Test Ex. 8 Comp. Ex. 8 |
|---|---|---|---|---|---|---|---|---|---|---|---|---|
|  | Material used |  |  |  |  |  |  |  |  |  |  |  |
| Shaping conditions | nozzle temperature (° C.) | 250 | 250 | 250 | 230 | 230 | 230 | 230 | 220 | 265 | 265 | 265 |
|  | heated bed temperature (° C.) | 30 | 30 | 30 | 80 | 80 | 80 | 85 | 85 | 30 | 30 | 30 |
|  | layer height (mm) | 0.5 | 0.5 | 0.5 | 0.5 | 0.5 | 0.5 | 0.5 | 0.5 | 0.5 | 0.5 | 0.5 |
|  | head diameter (mm) | 0.5 | 0.5 | 0.5 | 0.5 | 0.5 | 0.5 | 0.5 | 0.5 | 0.5 | 0.5 | 0.5 |
|  | head feed speed (mm/sec) | 30 | 30 | 30 | 30 | 30 | 30 | 30 | 30 | 30 | 30 | 30 |
| Properties | amount of warpage (mm) | 0.5 | 0.3 | 2.9 | 0.8 | 0.5 | 1.5 | 0.1 | 0.8 | 1.5 | 0.9 | 3.6 |
|  | shrinkage in build-up direction (%) | 0.21 | 0.09 | 0.58 | 0.18 | 0.15 | 0.88 | 0.6 | 1.0 | 0.58 | 0.23 | 1.1 |
|  | shrinkage in traveling direction (%) | 0.79 | 0.64 | 4.8 | 0.10 | 0.08 | 0.28 | 0.04 | 0.25 | 1.42 | 0.96 | 6.21 |
|  | interface adhesion (MPa) | 75 | 77 | 61 | 41 | 42 | 35 | 25 | 19 | 62 | 68 | 52 |

Tables 3 and 4 show that Test Examples 1 to 11 in which inorganic fibers were blended with PA12 resin, PAMXD6 resin, ABS resin, COC resin or PBT resin exhibited significantly low amounts of warpage and significantly low shrinkages both in the build-up direction and traveling direction as compared to Comparative Test Examples 1 to 8 in which no inorganic fibers were blended with PA12 resin, PAMXD6 resin, ABS resin, COC resin or PBT resin. Furthermore, it is shown that their interface adhesions were significantly improved.

As is obvious from comparison of Comparative Test Example 1 with Comparative Test Examples 2 to 4, the addition of an inorganic additive, such as carbon black or talc, into a thermoplastic resin generally decreases the interface adhesion. However, for example, comparison of Test Examples 1 to 4 with Comparative Test Example 1 shows that the addition of the inorganic fibers according to the present invention into a thermoplastic resin offered an unforeseen effect of increased interface adhesion.

TABLE 5

| | Materials used | Test Ex. 12 Ex. 1 | Test Ex. 13 Ex. 2 | Test Ex. 14 Ex. 3 | Test Ex. 15 Ex. 4 | Comp. Test Ex. 9 Comp. Ex. 1 | Comp. Test Ex. 10 Comp. Ex. 2 | Comp. Test Ex. 11 Comp. Ex. 3 | Comp. Test Ex. 12 Comp. Ex. 4 |
|---|---|---|---|---|---|---|---|---|---|
| Shaping conditions | nozzle temperature (° C.) | 250 | 250 | 250 | 250 | 210 | 250 | 250 | 250 |
| | heated bed temperature (° C.) | 30 | 30 | 30 | 30 | 30 | 30 | 30 | 30 |
| | layer height (mm) | 0.2 | 0.2 | 0.2 | 0.2 | 0.2 | 0.2 | 0.2 | 0.2 |
| | head diameter (mm) | 0.5 | 0.5 | 0.5 | 0.5 | 0.5 | 0.5 | 0.5 | 0.5 |
| | head feed speed (mm/sec) | 30 | 30 | 30 | 30 | 30 | 30 | 30 | 30 |
| Properties | tensile strength (MPa) | 60 | 64 | 74 | 60 | 57 | 52 | 43 | 50 |

TABLE 6

| | Materials used | Test Ex. 16 Ex. 5 | Test Ex. 17 Ex. 6 | Comp. Test Ex. 13 Comp. Ex. 5 | Test Ex. 18 Ex. 7 | Test Ex. 19 Ex. 8 | Comp. Test Ex. 14 Comp. Ex. 6 | Test Ex. 20 Ex. 9 | Comp. Test Ex. 15 Comp. Ex. 7 | Test Ex. 21 Ex. 10 | Test Ex. 22 Ex. 11 | Comp. Test Ex. 16 Comp. Ex. 8 |
|---|---|---|---|---|---|---|---|---|---|---|---|---|
| Shaping conditions | nozzle temperature (° C.) | 250 | 250 | 250 | 230 | 230 | 230 | 230 | 220 | 265 | 265 | 265 |
| | neared bed temperature (° C.) | 30 | 30 | 30 | 80 | 80 | 80 | 85 | 85 | 30 | 30 | 30 |
| | laver height (mm) | 0.2 | 0.2 | 0.2 | 0.2 | 0.2 | 0.2 | 0.2 | 0.2 | 0.5 | 0.5 | 0.5 |
| | head diameter (mm) | 0.5 | 0.5 | 0.5 | 0.5 | 0.5 | 0.5 | 0.5 | 0.5 | 0.5 | 0.5 | 0.5 |
| | head feed speed (mm/sec) | 30 | 30 | 30 | 30 | 30 | 30 | 30 | 30 | 30 | 30 | 30 |
| Properties | tensile strength (MPa) | 90 | 107 | 72 | 46 | 50 | 39 | 53 | 48 | 54 | 65 | 46 |

Tables 5 and 6 show that Test Examples 12 to 22 in which inorganic fibers were blended with the resin also exhibited high tensile strengths as compared to Comparative Test Examples 9 to 16 in which no inorganic fibers were blended with the resin.

TABLE 7

| | Materials used | Test Ex. 23 Ex. 1 | Test Ex. 24 Ex. 2 | Test Ex. 25 Ex. 3 | Test Ex. 26 Ex. 4 | Comp. Test Ex. 17 Comp. Ex. 1 | Comp. Test Ex. 18 Comp. Ex. 4 |
|---|---|---|---|---|---|---|---|
| Shaping conditions | nozzle temperature (° C.) | 250 | 250 | 250 | 250 | 210 | 250 |
| | heated bed temperature (° C.) | 30 | 30 | 30 | 30 | 30 | 30 |
| | layer height (mm) | 0.2 | 0.2 | 0.2 | 0.2 | 0.2 | 0.2 |
| | head diameter (mm) | 0.5 | 0.5 | 0.5 | 0.5 | 0.5 | 0.5 |
| | head feed speed (mm/sec) | 30 | 30 | 30 | 30 | 30 | 30 |
| Properties | flexural strength (MPa) | 52 | 58 | 73 | 54 | 48 | 54 |
| | flexural modulus (GPa) | 1.7 | 2.1 | 3.2 | 1.8 | 1.3 | 2.4 |

TABLE 8

| | Materials used | Test Ex. 27 Ex. 5 | Test Ex. 28 Ex. 6 | Comp. Test Ex. 19 Comp. Ex. 5 | Test Ex. 29 Ex. 7 | Test Ex. 30 Ex. 8 | Comp. Test Ex. 20 Comp. Ex. 6 | Test Ex. 31 Ex. 9 | Comp. Test Ex. 21 Comp. Ex. 7 | Test Ex. 32 Ex. 10 | Test Ex. 33 Ex. 11 | Comp. Test Ex. 22 Comp. Ex. 8 |
|---|---|---|---|---|---|---|---|---|---|---|---|---|
| Shaping conditions | nozzle temperature (° C.) | 250 | 250 | 250 | 230 | 230 | 230 | 230 | 220 | 265 | 265 | 265 |
| | heated bed temperature (° C.) | 30 | 30 | 30 | 80 | 80 | 80 | 85 | 85 | 30 | 30 | 30 |
| | layer height (mm) | 0.2 | 0.2 | 0.2 | 0.2 | 0.2 | 0.2 | 0.2 | 0.2 | 0.5 | 0.5 | 0.5 |
| | head diameter (mm) | 0.5 | 0.5 | 0.5 | 0.5 | 0.5 | 0.5 | 0.5 | 0.5 | 0.5 | 0.5 | 0.5 |
| | head feed speed (mm/sec) | 30 | 30 | 30 | 30 | 30 | 30 | 30 | 30 | 30 | 30 | 30 |
| Properties | flexural strength (MPa) | 132 | 187 | 114 | 72 | 72 | 61 | 83 | 80 | 82 | 115 | 69 |
| | flexural modulus (GPa) | 4.6 | 6.6 | 2.6 | 3.8 | 5.9 | 1.7 | 4.3 | 2.1 | 3.7 | 5.8 | 2.1 |

Tables 7 and 8 show that Test Examples 23 to 33 in which inorganic fibers were blended with the resin also exhibited high flexural strengths and flexural moduli as compared to Comparative Test Examples 17 and 19 to 22 in which no inorganic fibers were blended with the resin. Comparative Test Example 18 in which platy particles were blended with the resin exhibited high flexural strength and flexural modulus, but was shown from Tables 3 and 5 not to have increased the shrinkages, interface adhesion, and tensile strength.

<Production of Resin Composition and Resin Powder>

Example 12 and Comparative Examples 9 to 10

Materials were melt-kneaded in each composition ratio shown in Table 9 using a biaxial extruder to produce pellets. The cylinder temperature of the biaxial extruder was 270° C. to 300° C. The obtained pellets and polyethylene oxide were melt-mixed at 280° C. to 300° C. and the resultant mixture was immersed in water to dissolve polyethylene oxide in water, thus obtaining spherical resin powder. The average particle diameter of the spherical resin powder was measured with a laser diffraction particle size distribution measurement device (SALD-2100 manufactured by Shimadzu Corporation). The average particle diameters of Example 12, Comparative Example 9, and Comparative Example 10 were 70 μm, 50 μm, and 50 μm, respectively.

TABLE 9

| | | | Ex. 12 | Comp. Ex. 9 | Comp. Ex. 10 |
|---|---|---|---|---|---|
| Inorganic fibers | potassium titanate | % by mass | 20 | | |
| Thermoplastic resin | PPS resin | % by mass | 80 | 100 | 50 |
| Other additives | glass beads | % by mass | | | 50 |

<Production of Three-Dimensional Shaped Object Based on Powder Bed Fusion Process Test Examples 34 and Comparative Test Examples 23 to 24

The spherical resin powder obtained in each of Example 12 and Comparative Examples 9 to 10 was produced into a bending specimen having a shape shown in FIG. 4 by a powder bed fusion-based three-dimensional printer (manufactured by ASPECT Inc., trade name: RaFaEl II 150-HT) under the associated printing conditions shown in Table 10.

<Evaluation>

(1) Amount of Warpage

The shaped objects of bending specimens produced under the conditions in Table 10 were measured in terms of amount of warpage with a non-contact roughness and shape measurement device (a one-shot 3D shape measuring microscope VR-3000 manufactured by Keyence Corporation). The amount of warpage W is, as shown in FIG. 6, a difference in height along a build-up direction during shaping between the middle and ends of the bending specimen. The results are shown in Table 10.

(2) Shrinkage

The shaped objects of bending specimens produced under the conditions in Table 10 were measured in terms of shrinkage. The shrinkage was measured in the build-up direction. The shrinkage in the build-up direction is a shrinkage in the thickness of the bending specimen along the build-up direction during shaping.

(3) Interface Adhesion

Respective flexural strengths of the shaped objects of bending specimens produced under the conditions in Table 10 were divided by their respective packing densities and the obtained values were assumed as interface adhesions. The packing density is a value obtained by dividing the specific gravity of the shaped object of each bending specimen by the density of an injection-molded piece (a piece of the same shape injection-molded using pellets having the same composition). The flexural strength of the shaped object of each bending specimen obtained by the powder bed fusion process is the sum of interface strengths between powder particles. As the packing density decreases, the interface area correspondingly decreases and the flexural strength also correspondingly decreases.

The flexural strength was obtained by measuring each bending specimen produced under the conditions in Table 10 in terms of bending stress by a 60 mm-span three-point bending test with a tester Autograph AG-5000 (manufactured by Shimadzu Corporation). The specific gravity of each shaped object was measured in conformity to JIS 28807.

(4) Flexural Strength

The shaped objects of the bending specimens produced under the conditions in Table 10 were measured in terms of flexural strength by a 60 mm-span three-point bending test with a tester Autograph AG-5000 (manufactured by Shimadzu Corporation). The test results are shown in Table 10.

TABLE 10

|  | Materials used | Test Ex. 34 Ex. 12 | Comp. Test Ex. 23 Comp. Ex. 9 | Comp. Test Ex. 24 Comp. Ex. 10 |
|---|---|---|---|---|
| Shaping conditions | laser power (W) | 11 | 11 | 11 |
|  | feed temperature (° C.) | 240 | 240 | 240 |
|  | part temperature (° C.) | 250 | 250 | 250 |
|  | layer height (mm) | 0.1 | 0.1 | 0.1 |
| Properties | amount of warpage (mm) | 2.1 | 3.9 | 3.2 |
|  | shrinkage (%) | 0.9 | 1.5 | 1.1 |
|  | interface adhesion (MPa) | 97 | 84 | 48 |
|  | flexural strength (MPa) | 92 | 80 | 46 |

The invention claimed is:

1. A method for producing a shaped object, comprising:
feeding a filament being made of a resin composition to a fused deposition modeling-based three-dimensional printer and producing a shaped object by fused deposition modeling process,
wherein the resin composition contains inorganic fibers having an average fiber length of 1 μm to 300 μm and an average aspect ratio of 3 to 200; and a thermoplastic resin, and the inorganic fibers have a Mohs hardness of 5 or less, wherein the inorganic fibers are potassium titanate having an average fiber length of 10 μm to 20 μm and an average aspect ratio of 15 to 30,
wherein the thermoplastic resin is at least one selected from the group consisting of polyester resins, polyacetal resin, polycarbonate resin, aliphatic polyamide resins, semi-aromatic polyamide resins, polyphenylene sulfide resin, polyether sulfone resin, liquid crystal polyester resin, aromatic polyether ketone resins, polyether imide resin, polyamide-imide resin, and thermoplastic polyimide resin, and wherein a head diameter of an extrusion head of the three-dimensional printer is 0.5 mm or less.

2. The method for producing a shaped object according to claim 1, wherein a content of the inorganic fibers is 1% by mass to 40% by mass in a total amount of 100% by mass of the resin composition.

3. The method for producing a shaped object according to claim 1, wherein the potassium titanate is potassium octatitanate.

* * * * *